United States Patent
Maallem et al.

(10) Patent No.: US 11,291,050 B2
(45) Date of Patent: Mar. 29, 2022

(54) MANAGING MULTI-MODE COMMUNICATIONS BETWEEN NODES IN A NETWORK

(71) Applicant: ITRON, INC., Liberty Lake, WA (US)

(72) Inventors: Khalid Maallem, Meudon (FR); Yacine Khaled, Meudon (FR); Jérôme Bartier, Edinburgh (GB)

(73) Assignee: ITRON, INC., Liberty Lake, WA (US)

( * ) Notice: Subject to any disclaimer, the term of this patent is extended or adjusted under 35 U.S.C. 154(b) by 0 days.

(21) Appl. No.: 16/985,138

(22) Filed: Aug. 4, 2020

(65) Prior Publication Data

US 2022/0046706 A1 Feb. 10, 2022

(51) Int. Cl.
| | | |
|---|---|---|
| *H04W 74/08* | (2009.01) | |
| *H04W 76/18* | (2018.01) | |
| *H04W 74/04* | (2009.01) | |
| *H04W 74/02* | (2009.01) | |

(52) U.S. Cl.
CPC ....... *H04W 74/0816* (2013.01); *H04W 74/02* (2013.01); *H04W 74/04* (2013.01); *H04W 76/18* (2018.02)

(58) Field of Classification Search
CPC . H04W 74/0816; H04W 76/18; H04W 74/02; H04W 74/04
See application file for complete search history.

(56) References Cited

U.S. PATENT DOCUMENTS

| | | | |
|---|---|---|---|
| 2011/0268012 A1 | 11/2011 | Jo et al. | |
| 2012/0039296 A1* | 2/2012 | Walton | H04W 74/0808 370/329 |
| 2013/0250787 A1* | 9/2013 | Zhang | H04W 74/02 370/252 |
| 2015/0271786 A1 | 9/2015 | Xue et al. | |
| 2016/0191258 A1 | 6/2016 | Oyman et al. | |
| 2017/0325264 A1* | 11/2017 | Cherian | H04W 74/0816 |
| 2021/0127444 A1* | 4/2021 | Thein | H04W 80/02 |

OTHER PUBLICATIONS

Extended European Search Report for application No. 21188593.4 dated Dec. 17, 2021, 6 pages.

* cited by examiner

*Primary Examiner* — Kashif Siddiqui
(74) *Attorney, Agent, or Firm* — Artegis Law Group, LLP

(57) ABSTRACT

Various embodiments disclose a computer-implemented method for managing multi-mode communications between node devices in a network comprising initiating a carrier sense multiple access with collision avoidance (CSMA/CA) session at a first node while in a first mode, where the CSMA/CA session is associated with a request to transmit a data message to a second node, switching from the first mode to a second mode, in response to switching to the second mode, suspending the CSMA/CA session at the first node, switching back to the first mode, and in response to switching back to the first mode, resuming the CSMA/CA session at the first node.

20 Claims, 6 Drawing Sheets

MANAGING MULTI-MODE COMMUNICATIONS BETWEEN NODES IN A NETWORK

BACKGROUND

Field of the Various Embodiments

The various embodiments relate generally to wireless network communications, and more specifically, to managing unicast and broadcast communications.

Description of the Related Art

A wireless mesh network includes a plurality of nodes that are configured to communicate with and transmit data to one another using one or more communication protocols. In lieu of using a hierarchal topology, individual nodes within a wireless mesh network establish direct connections with other nodes within the network in order to efficiently route data to different locations in the network.

During operation, nodes communicate using a technique known as "channel hopping." With channel hopping, a given node periodically transitions between different channels. The particular sequence of channels across which a given node transitions is referred to as a "channel hopping sequence" or a "channel schedule." In the channel hopping sequence or channel schedule, each channel in the sequence is associated with a respective time slot. A given node can discover the channel schedules of its neighbors. A given node normally receives transmissions only on the current channel in a particular channel hopping sequence; therefore, other nodes typically transmit data to the given node based on the particular channel hopping sequence of that given node. The given node listens on the channel associated with the current time interval in the channel schedule. When attempting to transmit to a destination node, a given node first listens on the channel associated with the current time interval in the channel schedule of the destination node. By listening to the channel, the given node can sense whether the channel is already in use or whether channel is available. If the channel is not available, the given node backs off for a period of time before re-attempting to transmit, possibly on a different channel.

In the wireless mesh network, a node can transmit a unicast message to another node. Additionally, nodes can transmit broadcast messages (e.g., to a group of nodes) and/or receive broadcast messages from a central location. Each node can have a distinct channel schedule for unicast. Additionally, the nodes can have a common broadcast channel schedule (e.g., distributed by the central location). When nodes in the network reach a broadcast time slot in the broadcast channel schedule, the nodes in the network switch over from unicast mode to broadcast mode. When the broadcast time slot is over, the nodes switch back to unicast mode.

To further limit the possibility of two nodes transmitting either unicast or broadcast messages at the same time on a same channel, a carrier sense multiple access with collision avoidance (CSMA/CA) technique is typically used. Under CSMA/CA, before beginning a transmission on a channel, a node senses the channel to see if the channel is in use. If the channel is not in use, the node begins transmitting a message. However, if the channel is in use, the node starts a random backoff timer and waits unit the timer ends before checking the channel again and repeating the process. The use of a random backoff timer helps reduce the likelihood that two nodes that have started respective backoff timers will both end their backoff periods at the same time with both beginning a transmission on a channel that is not in use at the same time, which could result in a collision (e.g., overlap) between the two messages, which could result in both nodes transmitting having to retransmit their messages at a later time.

The use of backoff timers with CSMA/CA is further complicated when there is a switch between the unicast and multicast modes because it is possible that a backoff timer for a first mode (e.g., unicast or broadcast) can expire during the time period designated for a second mode (e.g., broadcast or unicast). For example, if the backoff timers for the first mode for two or more nodes expire during the second mode, then all of the nodes may try to transmit a message at the same time after switching back to the first mode. As an alternative example, if the backoff timer for the first mode for a node expires during the second mode, the backoff timer could be reset when the node switches back to the first mode. However, each of these approaches can cause a loss of randomization and asynchronization in transmissions between nodes that had facilitated avoidance of collisions, upset the equity in channel access between nodes, increase the delay for some transmissions, and reduce transmission capacity.

As the foregoing illustrates, what is needed in the art are more effective ways of managing CSMA/CA mechanisms when nodes switch between different transmission modes.

SUMMARY

Various embodiments disclose a computer-implemented method for managing multi-mode communications between nodes in a network comprising initiating a carrier sense multiple access with collision avoidance (CSMA/CA) session at a first node while in a first mode, where the CSMA/CA session is associated with a request to transmit a data message to a second node; switching from the first mode to a second mode; in response to switching to the second mode, suspending the CSMA/CA session at the first node; switching back to the first mode; and in response to switching back to the first mode, resuming the CSMA/CA session at the first node.

At least one technical advantage and improvement of the disclosed techniques is that the randomization and asynchronization of carrier sense and collision avoidance sessions are maintained, which reduces the likelihood of collisions. Accordingly, access to channels is more equitably distributed between nodes. Further, with less likelihood for collisions, transmissions delays are reduced, which increases the capacity of the network.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
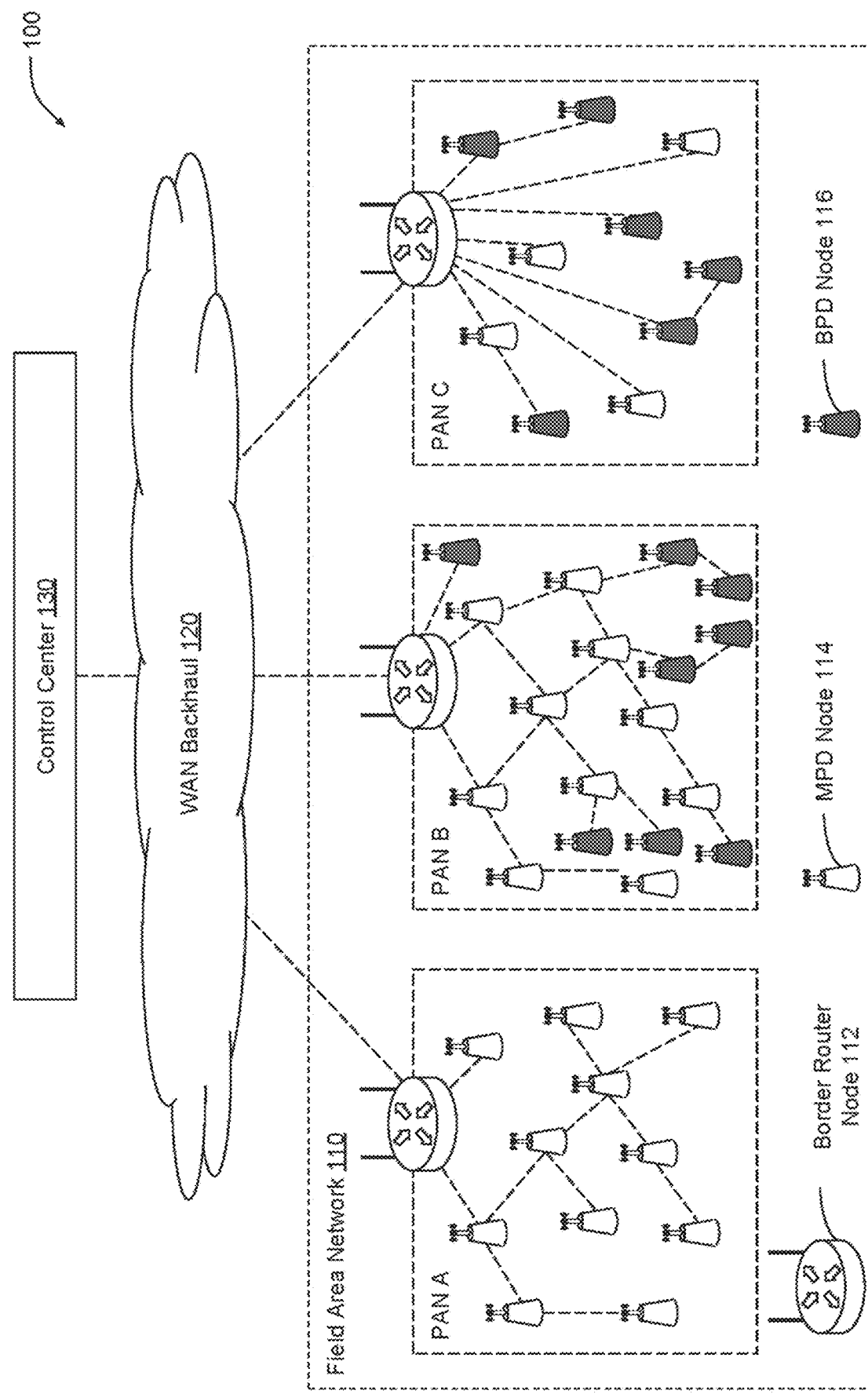
FIG. 1 illustrates a network system configured to implement one or more aspects of the various embodiments.

FIG. 1 illustrates a network system configured to implement one or more aspects of the various embodiments. As shown, network system 100 includes field area network (FAN) 110, wide area network (WAN) backhaul 120, and control center 130. FAN 110 is coupled to control center 130 via WAN backhaul 120. Control center 130 is configured to coordinate the operation of FAN 110.

FAN 110 includes personal area network (PANs) A, B, and C. PANs A and B are organized according to a mesh network topology, while PAN C is organized according to a star network topology. Each of PANs A, B, and C includes at least one border router node device 112 and one or more mains-powered device (MPD) node devices 114. PANs B and C further include one or more battery-powered device (BPD) node devices 116.

MPD node devices 114 draw power from an external power source, such as mains electricity or a power grid. MPD node devices 114 typically operate on a continuous basis without powering down for extended periods of time. BPD node devices 116 draw power from an internal power source, such as a battery or other local source (e.g., solar cell, etc.). BPD node devices 116 typically operate intermittently and, in some embodiments, may power down for extended periods of time in order to conserve battery power. MPD node devices 114 and/or BPD node devices 116 are configured to gather sensor data, process the sensor data, and communicate data processing results and/or other information to control center 130. Border router node devices 112 operate as access points that provide MPD node devices 114 and BPD node devices 116 with access to control center 130.

Any of border router node devices 112, MPD node devices 114, and/or BPD node devices 116 are configured to communicate directly with one or more adjacent node devices via bi-directional communication links. In various embodiments, a given communication link may be wired or wireless links, although in practice, adjacent node devices of a given PAN exchange data with one another by transmitting data packets via wireless radio frequency (RF) communications. The various node types are configured to perform a technique, known in the art as "channel hopping," in order to periodically receive data packets on varying channels. As known in the art, a "channel" may correspond to a particular range of frequencies. In one embodiment, a node device may compute a current "receive" channel by evaluating a Jenkins hash function that is based on a total number of channels, the media access control (MAC) address of the node device, and/or other information associated with the node device.

In various embodiments, each node device within a given PAN may implement a discovery protocol to identify one or more adjacent node devices or "neighbors." In such instances, a node device that has identified an adjacent, neighboring node device may establish a bi-directional communication link with the neighboring node device. Each neighboring node device may update a respective neighbor table to include information concerning the other node device, including the MAC address of the other node device, as well as a received signal strength indication (RSSI) of the communication link established with that node device. In various embodiments, the neighbor table may include information about one or more communication modes that the neighbor mode is capable of supporting, such as the operating parameters (e.g., data rates, modulation scheme, channel spacing, frequencies supported, channel schedule, etc.).

Node devices may compute the channel hopping sequences of adjacent node devices in order to facilitate successful transmission of data packets to such node devices. In embodiments where node devices implement the Jenkins hash function, a node device may compute a "current receive" channel of an adjacent node device using the total number of channels, the MAC address of the adjacent node device, and/or a time slot number assigned to a current time slot of the adjacent node device.

Any of the node devices discussed above may operate as a source node device, an intermediate node device, or a destination node device for the transmission of data packets. In some embodiments, a given source node device may generate a data packet and then transmit the data packet to a destination node device via any number of intermediate node devices (in mesh network topologies). In such instances, the data packet may indicate a destination for the packet and/or a particular sequence of intermediate node devices to traverse in order to reach the destination node device. In some embodiments, each intermediate node device may include a forwarding database indicating various network routes and cost metrics associated with each route.

Node devices 112, 114, 116 transmit data packets across a given PAN and across WAN backhaul 120 to control center 130. Similarly, control center 130 transmits data packets across WAN backhaul 120 and across any given PAN to a particular node device 112, 114, 116 included therein. As a general matter, numerous routes may exist which traverse any of PANs A, B, and C and include any number of intermediate node devices, thereby allowing any given node device or other component within network system 100 to communicate with any other node device or component included therein.

Control center 130 includes one or more server machines (not shown) configured to operate as sources for, and/or destinations of, data packets that traverse within network system 100. In various embodiments, the server machines may query node devices within network system 100 to obtain various data, including raw and/or processed sensor data, power consumption data, node/network throughput data, status information, and so forth. The server machines may also transmit commands and/or program instructions to any node device 112, 114, 116 within network system 100 to cause those node devices to perform various operations. In one embodiment, each server machine is a computing device configured to execute, via a processor, a software application stored in a memory to perform various network management operations.

Figure 2:
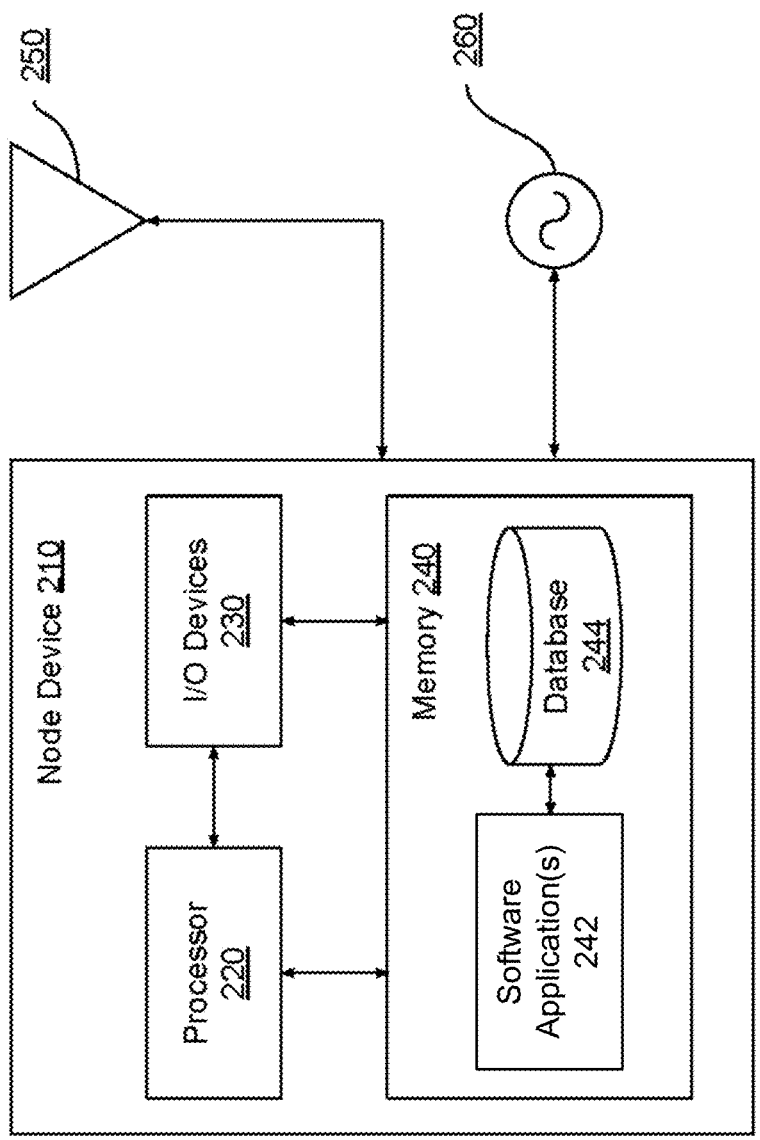
FIG. 2 illustrates a node device configured to transmit and receive data within the network system of FIG. 1, according to various embodiments.

In various embodiments, node devices 112, 114, 116 may likewise include computing device hardware configured to perform processing operations and execute program code. Each node device may further include various analog-to-digital (A/D) converters, digital-to-analog (D/A) converters, digital signal processors (DSPs), harmonic oscillators, transceivers, and/or any other components generally associated with RF-based communication hardware. FIG. 2 illustrates an exemplary node device that may operate within the network system 100.

FIG. 2 illustrates a node device configured to transmit and receive data within the network system of FIG. 1, according to various embodiments. As shown, node device 210 is coupled to transceiver 250 and oscillator 260. Node device 210 includes processor 220, input/output devices 230, and memory 240. Memory 240 includes one or more applications (e.g., software application 242) that communicate with database 244.

Node device 210 coordinates the operations of node device 210. Transceiver 250 is configured to transmit and/or receive data packets and/or other messages across network system 100 using a range of channels and power levels. Oscillator 260 provides one or more oscillation signals, according to which, in some embodiments, node device 210 may schedule the transmission and reception of data packets. In some embodiments, node device 210 may be used to implement any of border router node devices 112, MPD node devices 114, and/or BPD node devices 116 of FIG. 1.

Node device 210 includes a processor 220, input/output (I/O) devices 230, and memory 240, coupled together. In various embodiments, processor 220 may include any hardware configured to process data and execute software applications. Processor 220 may include a real-time clock (RTC) (not shown) according to which processor 220 maintains an estimate of the current time. The estimate of the current time may be expressed in Universal Coordinated Time (UTC), although any other standard of time measurement can also be used. I/O devices 230 include devices configured to receive input, devices configured to provide output, and devices configured to both receive input and provide output. Memory 240 may be implemented by any technically-feasible computer-readable storage medium.

Memory 240 includes one or more software applications 242 and database 244, coupled together. The one or more software applications includes program code that, when executed by processor 220, may performs any of the node-oriented computing functionality described herein. The one or more software applications 242 may also interface with transceiver 250 to coordinate the transmission and/or reception of data packets and/or other messages across network system 100, where the transmission and/or reception is based on timing signals generated by oscillator 260. In various embodiments, memory 240 may be configured to store protocols used in communication modes, equations and/or algorithms for identifying metric values, constants, data rate information, and other data used in identifying metric values, etc.

In operation, software application(s) 242 can implement various techniques to optimize communications with one or more linked node devices, such as a neighboring node device. In various embodiments, node device 210 may be configured to, using a plurality of different communication modes, transmit data messages to the linked node device and/or receive data messages from the linked node device by selecting a common communication mode that is supported by node device 210 and the linked node device. More generally, node device 210 can be configured for multi-mode communications. Node device 210 can communicate with a linked node or with control center 130 using any of a plurality of modes. The particular mode used for a given transmission depends on the particular circumstances of the transmission (e.g., the type of data message, the intended recipients of the data message, etc.). Examples of the modes include, without limitation, unicast, broadcast, and multicast.

In some embodiments, the communication modes include a unicast mode and a broadcast mode. In the unicast mode, node device 210 transmits a data message to another node (e.g., a destination node, an intermediate node); the transmission is a one-to-one transmission. While in unicast mode, node devices 210 implement one or more channel access methods to ensure that multiple node devices 210 can share a common transmission medium. In the broadcast mode, node device 210 broadcasts to all node devices 210 in FAN 110. Additionally or alternatively, in broadcast mode all node devices 210 in FAN 110 receives broadcasts from control center 130. In various embodiments, node devices 210 use a carrier sense multiple access with collision avoidance (CSMA/CA) technique for both unicast and broadcast transmissions. A node device 210 may start or initiate a CSMA/CA session for a request to transmit a data message. In the CSMA/CA session, the node device (e.g., software application 242) assesses the availability of a channel for transmission. The channel for which availability is assessed can be a channel in the channel schedule of the intended destination node. The node device can assess channel availability using any technically feasible technique (e.g., simply listening to the channel, performing a clear channel assessment (CCA), sending a "request to send" (RTS) to the intended destination node and waiting for a "clear to send" (CTS) issued by the intended destination node). If, in the CSMA/CA session, the node device determines that the channel is available, the node device transmits the data message on the channel, and the CSMA/CA session can end. If the node device determines that the channel is not available, the node device starts or initiates a backoff timer for the CSMA/CA session. The backoff timer, the length of which may be random, gives the node device a period of time to wait for the channel to clear before re-assessing the availability of the channel. When the backoff timer has ended, the node device can re-assess the availability of the channel. Depending on the result of the re-assessment, the node device can transmit the data message or initiate another backoff timer.

As described above, a node device can channel hop in order to periodically receive data packets on varying channels. A node device can channel hop according to a "channel hopping sequence," which may also be referred to as a "channel schedule." In some embodiments, a node device can compute its own channel schedule (e.g., via a Jenkins hash function) and share that channel schedule with neighboring nodes. In various embodiments, each node device has its own channel schedule for unicast mode (hereinafter "unicast channel schedule"), and a common channel schedule for broadcast mode (hereinafter "broadcast channel schedule"). For example, each node device can compute its own unicast channel schedule, and control center 130 distributes the common channel schedule for broadcast mode to the node devices in FAN 110. Details regarding the unicast channel schedules and the broadcast channel schedule are descried below.

Management of Unicast and Broadcast Communications

Figure 3:
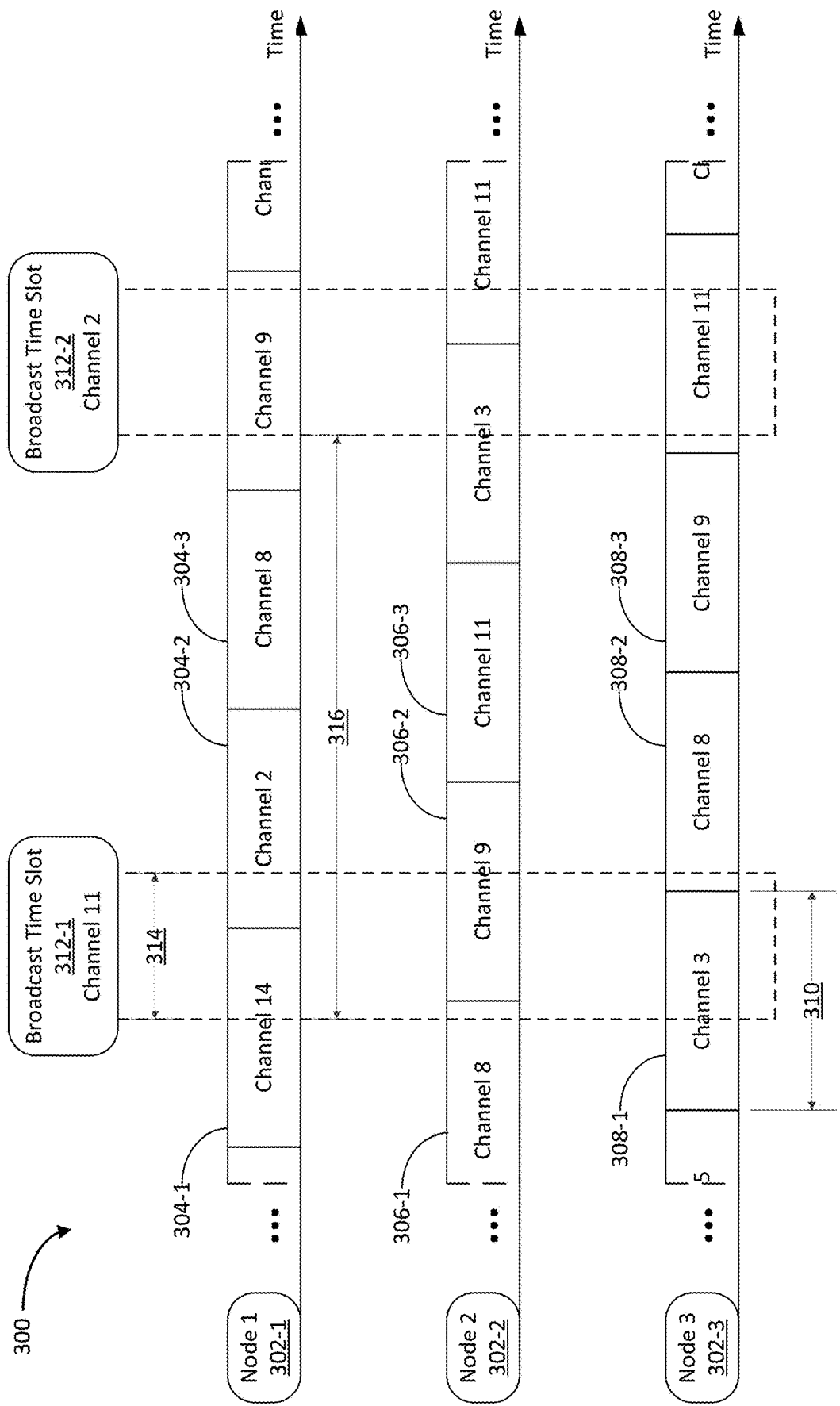
FIG. 3 illustrates unicast and broadcast schedules of multiple node devices within the network system of FIG. 1, according to various embodiments.

FIG. 3 illustrates example unicast and broadcast schedules of multiple node devices within the network system of FIG. 1, according to various embodiments. Channel schedule timeline 300 includes unicast channel schedules 302 for three node devices 210 within FAN 110. It should be appreciated that each node device within FAN 110 has its own unicast channel schedule, but channel schedule timeline 300 includes, for illustrative purposes only, three unicast channel schedules. In particular, channel schedule timeline 300 illustrates concurrent-in-time portions of channel schedules for three nodes in FAN 110.

A unicast channel schedule of a given node device has a sequence of unicast time slots, each of which is assigned a channel in the channel hopping sequence for the given node device. For example, channel schedule 302-1 for node device "Node 1" includes unicast time slots 304-1, 304-2, 304-3, etc. Unicast time slot 304-1 is assigned channel 14, unicast time slot 304-2 is assigned channel 2, and unicast time slot 304-3 is assigned channel 8. Channel schedule 302-2 for node device "Node 2" includes unicast time slots 306-1, 306-2, 306-3, etc. Unicast time slot 306-1 is assigned channel 8, unicast time slot 306-2 is assigned channel 9, and unicast time slot 306-3 is assigned channel 11. Schedule 302-3 for node device "Node 3" includes unicast time slots 308-1, 308-2, 308-3, etc. Unicast time slot 308-1 is assigned channel 3, unicast time slot 308-2 is assigned channel 8, and unicast time slot 308-3 is assigned channel 9. As shown, each node device may have a different sequence of channels in its channel schedule. Each unicast time slot 304, 306, or 308 in the unicast channel schedules has the same time length 310. Also as shown in FIG. 3, unicast channel schedules are not necessarily synchronized between nodes; unicast time slots 304, 306, and 308 are not aligned along channel schedule timeline 300.

A node device 210 may discover the channel schedule of its neighboring nodes. For example, if Node 1 and Node 2 are neighbors, Node 1 may discover channel schedule 302-2, and Node 2 may discover channel schedule 302-1. Accordingly, when Node 1 attempts to transmit a data message to Node 2, Node 1 selects a channel for the transmission attempt based on the channel schedule of Node 2. That is, Node 1 selects the channel assigned to the current time slot in channel schedule 302-2. A node device may discover the channel schedule of a neighboring device in any technically feasible manner. For example, Node 2 may request Node 1 for channel schedule 302-1 during the neighbor node discovery process, and then Node 2 may update its neighbor table to include channel schedule 302-1 for neighbor Node 1. As another example, Node 2 may compute the channel schedule 302-1 for neighbor Node 1 using the same Jenkins hash function approaches used by Node 2 to compute channel schedule 302-2.

Channel schedule timeline 300 also includes a broadcast channel schedule, which includes a channel hopping sequence associated with the broadcast mode. The broadcast channel schedule has a sequence of broadcast time slots 312 whose start times on channel schedule timeline 300 are spaced apart by time length 316. Each broadcast time slot 312 has a dwell interval time length 314. Each broadcast time slot 312 is assigned a channel in the channel hopping sequence associated with the broadcast mode. For example, broadcast time slot 312-1 is assigned channel 11, and broadcast time slot 312-2 is assigned channel 2. The broadcast channel schedule is common across the nodes in FAN 110. That is, noes in FAN 110 follow the same broadcast channel schedule for broadcast mode. Accordingly, as shown in FIG. 3, broadcast time slots 312 are applicable across Nodes 1, 2, and 3.

As shown in FIG. 3, time slots 312 of the broadcast channel schedule overlap unicast channel schedules 302 at certain times in channel schedule timeline 300. In various embodiments, a node device in FAN 110 can either be in unicast mode or broadcast mode, but not both, at any given time. Additionally, broadcast mode in a network system (e.g., network system 100) can have higher priority than unicast mode, in order to facilitate receipt of important broadcast data messages by nodes in FAN 110. Accordingly, nodes in network system 100 (e.g., node devices 112, 114, 116) change or switch modes, from unicast mode to broadcast mode, whenever a broadcast time slot 312 is reached. When a broadcast time slot 312 ends, nodes can change or switch modes back from broadcast mode to unicast mode.

Figure 4:
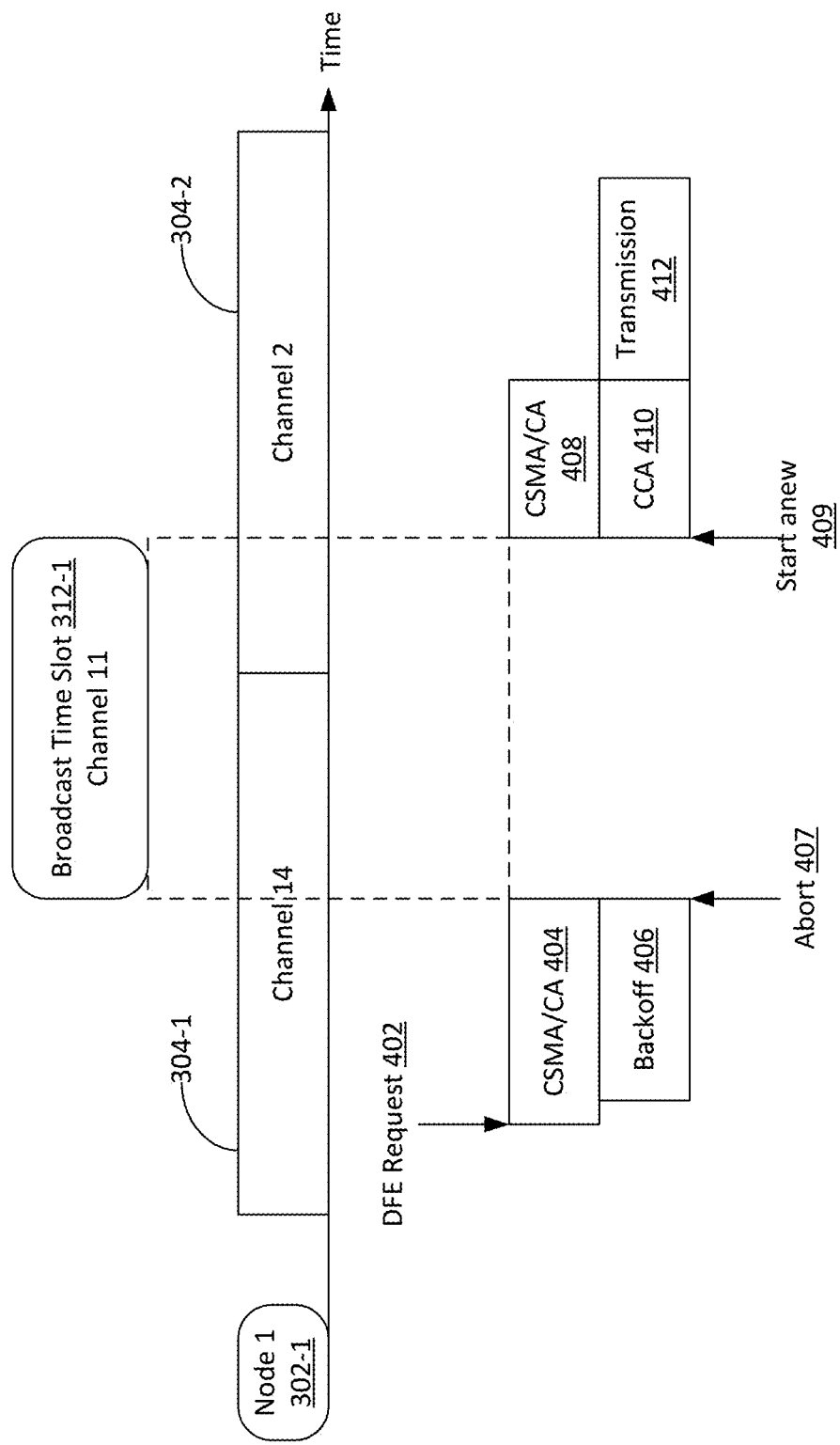
FIG. 4 illustrates handling of a carrier sense multiple access with collision avoidance session according to conventional, prior art approaches.

FIG. 4 illustrates handling of a carrier sense multiple access with collision avoidance session according to conventional, prior art approaches. As described above, a node device in FAN 110 can change mode, from unicast mode to broadcast mode, whenever a broadcast time slot 312 is reached. Additionally, a node device in FAN 110 can implement a CSMA/CA technique for unicast transmissions. FIG. 4 illustrates the interaction of the CSMA/CA technique with the change to broadcast mode, according to conventional approaches. FIG. 4 illustrates magnified portions of unicast channel schedule 302-1 for Node 1 and the broadcast channel schedule of FIG. 3. In particular, FIG. 3 shows time slots 304-1 and 304-2 of unicast channel schedule 302-1 and broadcast time slot 312-1.

As shown in FIG. 4, at some time during time slot 304-1, at a node neighboring Node 1 (e.g., Node 2), software application 242 makes a direct frame exchange (DFE) request 402. DFE request 402 serves as a request by Node 2 to transmit a unicast message to Node 1. Based on DFE request 402, software application 242 at Node 2 initiates a CSMA/CA session 404 to assess the availability of channel 14, which is the channel that Node 1 listens to for unicast transmissions in time slot 304-1. For example, software application 242 could listen to channel 14. If software application 242 determines that channel 14 is unavailable, then software application 242 starts a backoff timer 406 for CSMA/CA session 404 before re-assessing the availability of channel 14 or, if time slot 304-1 has ended by the time the backoff timer 406 is completed, a subsequent channel in channel schedule 302-1. Backoff timer 406 has a length that is typically not predefined. For example, the length of backoff timer 406 may be random and determined by software application 242 when initiating the backoff.

When a time slot 312 in the broadcast channel schedule is reached, nodes in FAN 110 change mode to broadcast mode. According to conventional approaches, when a node changes to broadcast mode, any ongoing CSMA/CA session and associated backoff are aborted. For example, as shown in FIG. 4, when the start of time slot 312-1 is reached, software application 242 at Node 2 aborts 407 CSMA/CA session 404 and backoff timer 406, and whatever time that is remaining in backoff timer 406 is discarded. After time slot 312-1 has ended, the nodes change back to unicast mode. After changing back to unicast mode, the node starts a new CSMA/CA session for the transmission attempt. For example, software application 242 at Node 2 starts 409 a new CSMA/CA session 408 for DFE request 402. In the new session 408, Node 2 assesses the availability of the channel assigned to the current time slot in the unicast channel schedule of Node 1. As shown in FIG. 4, the current time slot at start 409 of session 408 is time slot 304-2, to which is assigned channel 2. Accordingly, software application 242 at Node 2 can perform a clear channel assessment (CCA) 410 for channel 2. If software application 242 determines that channel 2 is available, then software application 242 can proceed with transmission 412 of the data message associated with DFE request 402 to Node 1. If software application 242 determines that channel 2 is not available, then software application 242 can start another, new backoff timer that may be different in time length from backoff timer 406. Alternatively, Node 2 could automatically start another, new backoff timer without first performing the clear channel assessment 410 of channel 2.

As shown in FIG. 4, a CSMA/CA session and the associated backoff timer are aborted when a node switches to broadcast mode, and a CSMA/CA session is started anew when the node switches back to unicast mode. This approach to handling the CSMA/CA session when changing between unicast mode and broadcast mode has some drawbacks. For example, because the broadcast channel schedule is common across nodes in FAN 110, broadcast time slots 312 end at the same time across FAN 110 and nodes in FAN 110 change back to unicast mode at approximately the same time. As a result, the new CSMA/CA sessions of nodes in FAN 110 are synchronized and competition for channels are increased. With the increased competition for channels, the likelihood of collisions increases as multiple nodes may receive a clear channel assessment and then begin transmissions that cause a collision. These collisions increase delays for these transmissions. Furthermore, because of the increased competition for channels, equity in channel access between nodes is disrupted and transmission capacity is reduced.

Figure 5:
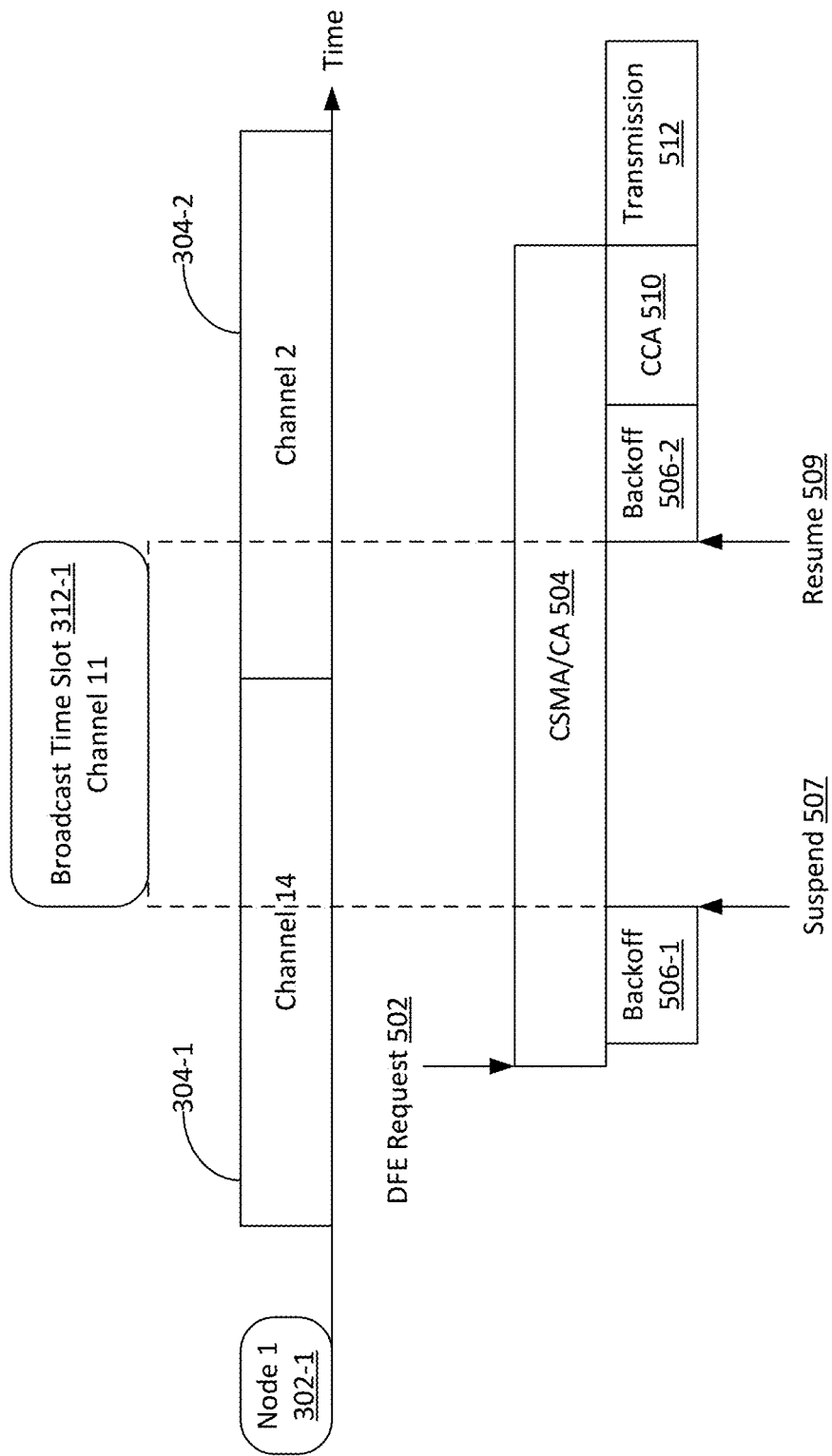
FIG. 5 illustrates handling of a carrier sense multiple access with collision avoidance session according to various embodiments.

To address these drawbacks, various embodiments implement a different approach to handling a CSMA/CA session when switching between modes. FIG. 5 illustrates handling of a carrier sense multiple access with collision avoidance session, according to various embodiments. FIG. 5 shows the same portion of unicast channel schedule 302-1 and the same broadcast time slot 312-1 as FIG. 4. As with FIG. 4, software application 242 at a node neighboring Node 1 (e.g., Node 2) makes a DFE request 502 and initiates an associated CSMA/CA session 504. After determining that channel 14 associated with the current time slot 304-1 in unicast channel schedule 302-1 is unavailable, software application 242 starts a backoff timer 506.

When broadcast time slot 312-1 is reached, software application 242 at Node 2 changes to broadcast mode. As shown in FIG. 5, however, instead of aborting CSMA/CA session 504 and backoff timer 506 as in FIG. 4, software application 242 at Node 2 suspends 507 CSMA/CA session 504 and accordingly also pauses backoff timer 506. When time slot 312-1 ends and software application 242 at Node 2 changes back to unicast mode, software application 242 also resumes 509 CSMA/CA session 504 and backoff timer 506. After backoff timer 506 expires, software application 242 performs a CCA 540 for channel 2, which is assigned to the current time slot 304-2. If software application 242 determines that channel 2 is available, then software application 242 can proceed with transmission 512 of the data message associated with DFE request 502 to Node 1. If software application 242 determines that channel 2 is not available, then software application 242 can start another backoff timer similar to backoff timer 506.

As shown in FIG. 5, the backoff timer 506 is paused during the time interval of broadcast time slot 312-1. Accordingly, the total time of backoff timer 506 is divided into two portions, backoff portion 506-1 that ran from the start of backoff timer 506 up to suspension 507 of CSMA/CA session 504, and backoff portion 506-2 that ran from resumption 509 of CSMA/CA session 504 to the completion of backoff timer 506. Meanwhile, CSMA/CA session 504 is suspended during the time interval of broadcast time slot 312-1, instead of being aborted. Software application 242 postpones operations associated with CSMA/CA session 504 (e.g., performing a CCA, sending an RTS, listening to a channel to determine availability) until after resumption of CSMA/CA session 504 and the expiration of backoff timer 506.

By suspending and then resuming CSMA/CA session 504 instead of aborting, CSMA/CA sessions between nodes are not synchronized after the end of a broadcast time slot. Accordingly, competition for channels at the end of a broadcast time slot is reduced, reducing the likelihood for collisions and transmission delays, and maintaining equity in channel access and transmission capacity.

In some embodiments, nodes also use a CSMA/CA technique when requesting to transmit a broadcast data message. Accordingly, when a node changes to broadcast mode and attempts to transmit a broadcast message in a broadcast time slot, the node can initiate a CSMA/CA session associated with the broadcast transmission request. In the CSMA/CA session, the node assesses the availability of the channel assigned to the broadcast time slot. If the channel is unavailable, the node initiates a backoff timer associated with the broadcast transmission request. When the broadcast time slot ends and the node changes to unicast mode, the node can suspend the CSMA/CA session and pause the backoff timer associated with the broadcast transmission request, similar to the suspension of the CSMA/CA session for unicast described above in conjunction with FIG. 5. The CSMA/CA session and backoff timer associated with the broadcast transmission request resume at the next broadcast time slot. The CSMA/CA session may be suspended again, and the backoff timer paused again, if the backoff timer does not fully run in the broadcast time slot after resumption. Thus, the CSMA/CA session and the backoff timer associated with the broadcast transmission request may be suspended/paused and resumed as many times as needed until the backoff timer fully runs.

More generally, the above-disclosed techniques may be used whenever a node in a network system implements CSMA/CA or similar techniques for multiple communication modes (e.g., unicast, broadcast, multi-cast). For example, each node in a wireless mesh network can be configured for unicast, broadcast, and/or multi-cast modes. A channel schedule is associated with each of these modes, and channel CSMA/CA techniques are used in each of these modes. The node can implement the above-disclosed techniques to manage CSMA/CA sessions and backoff timers when switching from any one of the modes to any other one of the modes.

Figure 6:
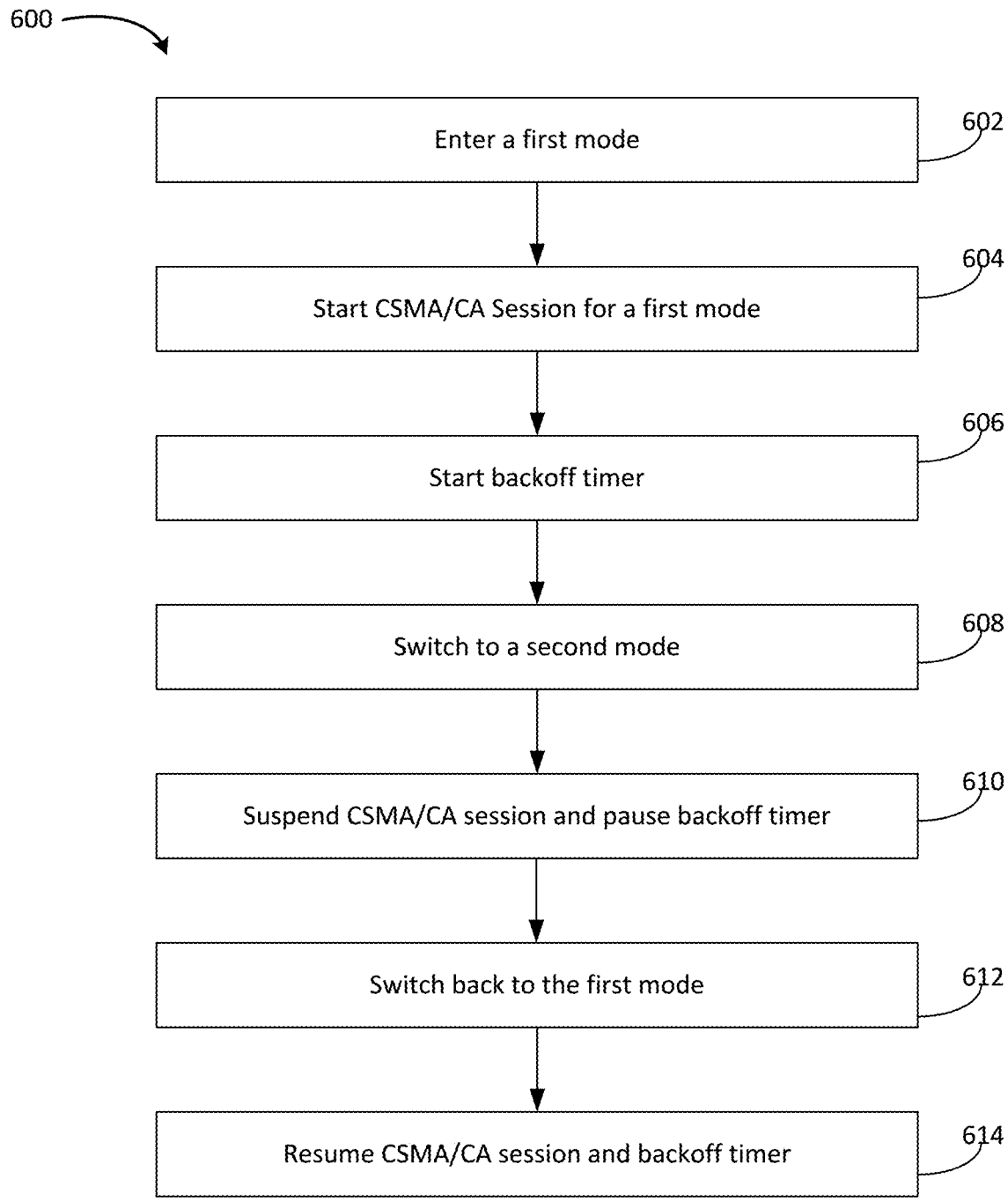
FIG. 6 is a flow diagram of method steps for managing multi-mode communications between nodes in a network system, according to various embodiments.

FIG. 6 is a flow diagram of method steps for managing multi-mode communications between nodes in a network system, according to various embodiments. Although the method steps are described with respect to the systems of FIGS. 1-5, persons skilled in the art will understand that any system configured to perform the method steps, in any order, falls within the scope of the various embodiments.

As shown, a method 600 begins at step 602, where software application 242 enters a first mode. For example, when a node powers on (e.g., at initial power on or after a restart) or when a broadcast time slot 312 ends, software application 242 could enter a unicast mode.

At step 604, software application 242 starts a CSMA/CA session for a first mode. Software application 242 makes a DFE request 502, and starts a CSMA/CA session 504 associated with DFE request 502 to assess the availability of a channel assigned to a current time slot in a unicast channel schedule of the destination node (e.g., channel 14 for time slot 304-1 in unicast channel schedule 302-1).

At step 606, software application 242 starts a backoff timer. When software application 242 determines that the channel is unavailable, software application 242 starts a backoff timer 506.

At step 608, software application 242 switches to a second mode. For example, a switch in mode may occur when switching from unicast mode to broadcast mode (e.g., when a broadcast time slot 312-1 has started in the example of FIG. 5) or when switching from broadcast mode to unicast mode (e.g., when the broadcast time slot 312-1 ends in the example of FIG. 5).

At step 610, in response to switching to the second mode, software application 242 suspends the CSMA/CA session started during step 604 and pauses the backoff timer started during step 606. In the example of FIG. 5, in response to changing to broadcast mode at the start of broadcast time slot 312-1, software application 242 suspends 507 unicast CSMA/CA session 504 and pauses backoff timer 506. A backoff portion 506-1 of backoff timer 506 has run when CSMA/CA session 504 is suspended 507.

At step 612, software application 242 switches the mode of the node back to the first mode. For example, a switch in mode may occur when switching back to unicast mode from broadcast mode (e.g., when broadcast time slot 312-1 has ended in the example of FIG. 5).

At step 614, in response to switching back to the first mode, software application 242 resumes the CSMA/CA session started during step 602 and the backoff timer started during step 604. In the example of FIG. 5, in response to changing back to unicast mode at the end of broadcast time slot 312-1, software application 242 resumes 509 CSMA/CA session 504 and backoff timer 506. The remaining backoff portion 506-2 of backoff timer 506 begins running when backoff timer 506 is resumed.

In sum, a node is configured to suspend a carrier sense multiple access with collision avoidance session when switching from a first mode to a second mode. Prior to transmission of a message in the first node, a node initiates a CSMA/CA session. The node determines that a channel is unavailable and initiates a backoff timer in response. The node then switches to a second mode. The node suspends the CSMA/CA session and pauses the backoff timer while in the second mode. After switching back to the first mode, the node resumes the CSMA/CA session and the backoff timer.

At least one technical advantage and improvement of the disclosed techniques is that the randomization and asynchronization of carrier sense and collision avoidance sessions are maintained, which reduces the likelihood of collisions. Accordingly, access to channels is more equitably distributed between nodes. Further, with less likelihood for collisions, transmissions delays are reduced, which increases the capacity of the network.

1. In some embodiments, a computer-implemented method for managing multi-mode communications between nodes in a network comprises initiating a carrier sense multiple access with collision avoidance (CSMA/CA) session at a first node while in a first mode, wherein the CSMA/CA session is associated with a request to transmit a data message to a second node; switching from the first mode to a second mode; in response to switching to the second mode, suspending the CSMA/CA session at the first node; switching back to the first mode; and in response to switching back to the first mode, resuming the CSMA/CA session at the first node.

2. The method of clause 1, wherein initiating the CSMA/CA session at the first node comprises determining availability of a first channel associated with a channel schedule of the second node for the first mode.

3. The method of clauses 1 or 2, further comprising determining that the first channel is unavailable; in response to determining that the first channel is unavailable, initiating a backoff timer.

4. The method of any of clauses 1-3, wherein suspending the CSMA/CA session comprises pausing the backoff timer.

5. The method of any of clauses 1-4, wherein resuming the CSMA/CA session comprises resuming the backoff timer.

6. The method of any of clauses 1-5, further comprising, after resuming the CSMA/CA session, determining availability of a second channel associated with the channel schedule of the second node for the first mode.

7. The method of any of clauses 1-6, wherein the second channel is different from the first channel.

8. The method of any of clauses 1-7, wherein the first mode is a unicast mode and the second mode is a broadcast mode.

9. The method of any of clauses 1-8, wherein the first mode is a broadcast mode and the second mode is a unicast mode.

10. In some embodiments, one or more non-transitory computer-readable media store program instructions that, when executed by a processor, cause the processor to manage multi-mode communications between nodes in a network by performing the steps of initiating a carrier sense multiple access with collision avoidance (CSMA/CA) session at a first node while in a first mode, wherein the CSMA/CA session is associated with a request to transmit a data message to a second node; switching from the first mode to a second mode; in response to changing to the second mode, suspending the CSMA/CA session at the first node; switching back to the first mode; and in response to switching back to the first mode, resuming the CSMA/CA session at the first node.

11. The one or more computer-readable storage media of clause 10, wherein suspending the CSMA/CA session comprises pausing a backoff timer associated with the CSMA/CA session.

12. The one or more computer-readable storage media of clauses 10 or 11, wherein resuming the CSMA/CA session comprises resuming the backoff timer.

13. The one or more computer-readable storage media of any of clauses 10-12, wherein the switching from the first mode to the second mode is based on a channel schedule associated with the second mode.

14. The one or more computer-readable storage media of any of clauses 10-13, wherein the first mode is a unicast mode and the second mode is a broadcast mode; or the first mode is a broadcast mode and the second mode is a unicast mode.

15. The one or more computer-readable storage media of any of clauses 10-14, wherein, when the first mode is the unicast mode and the second mode is the broadcast mode, the steps further comprise switching from the unicast mode to the broadcast mode at a start of a broadcast time slot included in the broadcast channel schedule; and switching from the broadcast mode to the unicast mode at an end of the broadcast time slot.

16. In some embodiments, a system comprises a plurality of nodes included in a wireless mesh network; a first node included in the plurality of nodes; and a second node included in the plurality of nodes, the second node configured to perform the steps of initiating a carrier sense multiple access with collision avoidance (CSMA/CA) session, wherein the CSMA/CA session is associated with a request to transmit a data message to the first node; switching from the first mode to a second mode; in response to switching to the second mode, suspending the CSMA/CA session; switching back to the first mode; and in response to switching back to the first mode, resuming the CSMA/CA session.

17. The system of clause 16, wherein the second node is configured to perform the steps of determining availability of a first channel associated with a channel schedule of the first node for the first mode; determining that the first channel is unavailable; and in response to determining that the first channel is unavailable, initiating a backoff timer.

18. The system of clauses 16 or 17, wherein suspending the CSMA/CA session comprises pausing the backoff timer.

19. The system of any of clauses 16-18, wherein resuming the CSMA/CA session comprises resuming the backoff timer.

20. The system of any of clauses 16-19, wherein the switching from the first mode to the second mode comprises switching to the second mode in accordance with a start of a time slot included in a channel schedule associated with the second mode.

Any and all combinations of any of the claim elements recited in any of the claims and/or any elements described in this application, in any fashion, fall within the contemplated scope of the present protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
   initiating a carrier sense multiple access with collision avoidance (CSMA/CA) session at a first node while in a first mode, wherein the CSMA/CA session is associated with a request to transmit a data message to a second node;
   switching from the first mode to a second mode;
   in response to switching to the second mode, suspending the CSMA/CA session at the first node by suspending one or more operations for assessing availability of a channel for transmitting the data message to the second node in the first mode;

switching back to the first mode; and in response to switching back to the first mode, resuming the CSMA/CA session at the first node.

2. The method of claim 1, wherein initiating the CSMA/CA session at the first node comprises determining availability of a first channel associated with a channel schedule of the second node for the first mode.

3. The method of claim 2, further comprising:

determining that the first channel is unavailable; and in response to determining that the first channel is unavailable, initiating a backoff timer.

4. The method of claim 3, further comprising pausing the backoff timer while the CSMA/CA session is suspended.

5. The method of claim 4, further comprising resuming the backoff timer when the CSMA/CA session is resumed.

6. The method of claim 2, further comprising, after resuming the CSMA/CA session, determining availability of a second channel associated with the channel schedule of the second node for the first mode.

7. The method of claim 6, wherein the second channel is different from the first channel.

8. The method of claim 1, wherein the first mode is a unicast mode and the second mode is a broadcast mode.

9. The method of claim 1, wherein the first mode is a broadcast mode and the second mode is a unicast mode.

10. One or more non-transitory computer-readable media storing program instructions that, when executed by one or more processors, cause the one or more processors to perform the steps of:

initiating a carrier sense multiple access with collision avoidance (CSMA/CA) session at a first node while in a first mode, wherein the CSMA/CA session is associated with a request to transmit a data message to a second node;

switching from the first mode to a second mode;

in response to switching to the second mode, suspending the CSMA/CA session at the first node by suspending one or more operations for assessing availability of a channel for transmitting the data message to the second node in the first mode;

switching back to the first mode; and in response to switching back to the first mode, resuming the CSMA/CA session at the first node.

11. The one or more computer-readable storage media of claim 10, further comprising pausing a backoff timer associated with the CSMA/CA session while the CSMA/CA session is suspended.

12. The one or more computer-readable storage media of claim 11, further comprising resuming the backoff timer when the CSMA/CA session is resumed.

13. The one or more computer-readable storage media of claim 10, wherein the switching from the first mode to the second mode is based on a channel schedule associated with the second mode.

14. The one or more computer-readable storage media of claim 10, wherein:

the first mode is a unicast mode and the second mode is a broadcast mode; or the first mode is a broadcast mode and the second mode is a unicast mode.

15. The one or more computer-readable storage media of claim 14, wherein, when the first mode is the unicast mode and the second mode is the broadcast mode, the steps further comprise:

switching from the unicast mode to the broadcast mode at a start of a broadcast time slot included in a broadcast channel schedule; and switching from the broadcast mode to the unicast mode at an end of the broadcast time slot.

16. A system, comprising:

a plurality of nodes included in a wireless mesh network;

a first node included in the plurality of nodes; and a second node included in the plurality of nodes, the second node configured to perform the steps of:

initiating a carrier sense multiple access with collision avoidance (CSMA/CA) session, wherein the CSMA/CA session is associated with a request to transmit a data message to the first node in a first mode;

switching from the first mode to a second mode;

in response to switching to the second mode, suspending the CSMA/CA session by suspending one or more operations for assessing availability of a channel for transmitting the data message to the second node in the first mode;

switching back to the first mode; and in response to switching back to the first mode, resuming the CSMA/CA session.

17. The system of claim 16, wherein the second node is configured to perform the steps of:

determining availability of a first channel associated with a channel schedule of the first node for the first mode;

determining that the first channel is unavailable; and in response to determining that the first channel is unavailable, initiating a backoff timer.

18. The system of claim 16, wherein the switching from the first mode to the second mode comprises switching to the second mode in accordance with a start of a time slot included in a channel schedule associated with the second mode.

19. The method of claim 1, wherein the one or more operations for assessing availability of a channel for transmitting the data message to the second node in the first mode include listening to the channel.

20. The method of claim 1, wherein the one or more operations for assessing availability of a channel for transmitting the data message to the second node in the first mode include performing a clear channel assessment.

* * * * *